United States Patent
Chang et al.

(10) Patent No.: US 11,610,003 B2
(45) Date of Patent: Mar. 21, 2023

(54) SOFTWARE PROTECTION METHOD AND SYSTEM THEREOF

(71) Applicant: DELTA ELECTRONICS, INC., Taoyuan (TW)

(72) Inventors: Hao-Chieh Chang, Taoyuan (TW); Chia-Lin Liu, Taoyuan (TW); Wan-Sheng Ni, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 395 days.

(21) Appl. No.: 17/022,057

(22) Filed: Sep. 15, 2020

(65) Prior Publication Data
US 2021/0374254 A1    Dec. 2, 2021

(30) Foreign Application Priority Data
May 29, 2020    (CN) .......................... 202010472616.4

(51) Int. Cl.
| G06F 21/00 | (2013.01) |
| G06F 21/60 | (2013.01) |
| G06F 21/64 | (2013.01) |
| G06F 21/57 | (2013.01) |
| G06F 9/445 | (2018.01) |
| G06F 9/4401 | (2018.01) |
| G06F 21/54 | (2013.01) |

(52) U.S. Cl.
CPC .......... *G06F 21/602* (2013.01); *G06F 9/4411* (2013.01); *G06F 9/44521* (2013.01); *G06F 21/54* (2013.01); *G06F 21/572* (2013.01); *G06F 21/64* (2013.01); *G06F 2221/0755* (2013.01)

(58) Field of Classification Search
CPC .. G06F 21/602; G06F 9/4411; G06F 9/44521; G06F 21/54; G06F 21/572; G06F 21/64; G06F 2221/0755; G06F 21/12; G06F 21/125; G06F 2221/0753
See application file for complete search history.

(56) References Cited

U.S. PATENT DOCUMENTS

| 4,634,807 A | 1/1987 | Chorley et al. |
| 6,052,780 A * | 4/2000 | Glover .................... G06F 21/54 |
| | | 380/255 |

(Continued)

FOREIGN PATENT DOCUMENTS

| CN | 101282468 A | 10/2008 |
| TW | 201525761 A | 7/2015 |
| TW | I551104 B | 9/2016 |

*Primary Examiner* — John B King
(74) *Attorney, Agent, or Firm* — CKC & Partners Co., LLC

(57) ABSTRACT

A software protection method includes decrypting an encrypted executable file by a processor, and the steps of decrypting include the following steps. A linking instruction is executed in a first execution environment; based on the linking instruction, a signature corresponding to the encrypted executable file is generated in the first execution environment; based on the signature and a hash table, a decryption algorithm is performed and a key is generated in the first execution environment; and the key is transmitted from the first execution environment to a second execution environment that is different from the first execution environment. The encrypted executable file is in the second execution environment. A software protection system is also disclosed herein.

11 Claims, 6 Drawing Sheets

(56) References Cited

U.S. PATENT DOCUMENTS

| | | | | |
|---|---|---|---|---|
| 6,055,503 A * | 4/2000 | Horstmann | ............... | G06F 8/61 |
| | | | | 705/51 |
| 8,856,938 B2 * | 10/2014 | Dik | ......................... | G06F 21/57 |
| | | | | 713/187 |
| 2004/0243807 A1 * | 12/2004 | Hughes | ................ | H04L 9/3236 |
| | | | | 713/176 |
| 2007/0143630 A1 * | 6/2007 | Zunke | .................... | G06F 21/123 |
| | | | | 713/189 |
| 2007/0198838 A1 * | 8/2007 | Nonaka | ................. | H04L 9/3247 |
| | | | | 713/176 |
| 2007/0234430 A1 * | 10/2007 | Goldsmid | ............. | G06F 21/121 |
| | | | | 726/26 |
| 2010/0017879 A1 * | 1/2010 | Kuegler | ................. | G06F 21/54 |
| | | | | 726/25 |
| 2015/0287432 A1 * | 10/2015 | Nakano | ................. | H04L 63/061 |
| | | | | 386/259 |
| 2015/0341473 A1 * | 11/2015 | Dumitrescu | ........ | H04L 45/7453 |
| | | | | 370/392 |
| 2018/0101684 A1 * | 4/2018 | Murphy | ................ | H04L 9/3247 |
| 2019/0340393 A1 * | 11/2019 | Mo | ....................... | G06F 21/554 |
| 2021/0306304 A1 * | 9/2021 | Hwang | ................... | G06F 21/10 |
| 2021/0306687 A1 * | 9/2021 | Nelson | .................... | H04H 60/31 |

\* cited by examiner

SOFTWARE PROTECTION METHOD AND SYSTEM THEREOF

CROSS-REFERENCE TO RELATED APPLICATION

This application claims priority to China Application Serial Number 202010472616.4, filed May 29, 2020, all of which are herein incorporated by reference.

BACKGROUND

Field of Invention

The present invention relates to a software protection technique, and is especially relates to a technique of encrypting an executable file.

Description of Related Art

With the rapid development of technology, software technique also makes progress correspondingly. Recently, the technique regarding software protection includes encrypting the executable file to achieve the purpose of protection, wherein it should consider that how to hide the key for encryption and decryption requirement. However, the current method of hiding the key is limited, which includes the requirement of network connection, the computing ability of the device loaded with the software, or the requirement of supporting the dongle device.

SUMMARY

The present disclosure provides a software protection method that includes decrypting an encrypted executable file by a first processor, wherein the decrypting includes the following steps. A linking instruction is executed in a first execution environment. A signature corresponding to the encrypted executable file is generated, based on the linking instruction, in the first execution environment. A decryption algorithm is performed and a key is generated, based on the signature and a hash table, in the first execution environment. The key is transmitted, from the first execution environment, to a second execution environment that is different from the first execution environment. The encrypted executable file is in the second execution environment.

The present disclosure also provides a software protection including a first processor and a first memory. The first memory is configured to store at least one first program code, wherein the first processor is configured to execute the at least one first program code in the first memory, to execute a decryption program. The executing the decryption program includes the following steps. A linking instruction is executed, in a first execution environment. A signature corresponding to the encrypted executable file is generated, based on the linking instruction, in the first execution environment. A decryption algorithm is performed and a key is generated, based on the signature and a hash table, in the first execution environment. The key is transmitted, from the first execution environment, to a second execution environment that is different from the first execution environment. The encrypted executable file is in the second execution environment.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
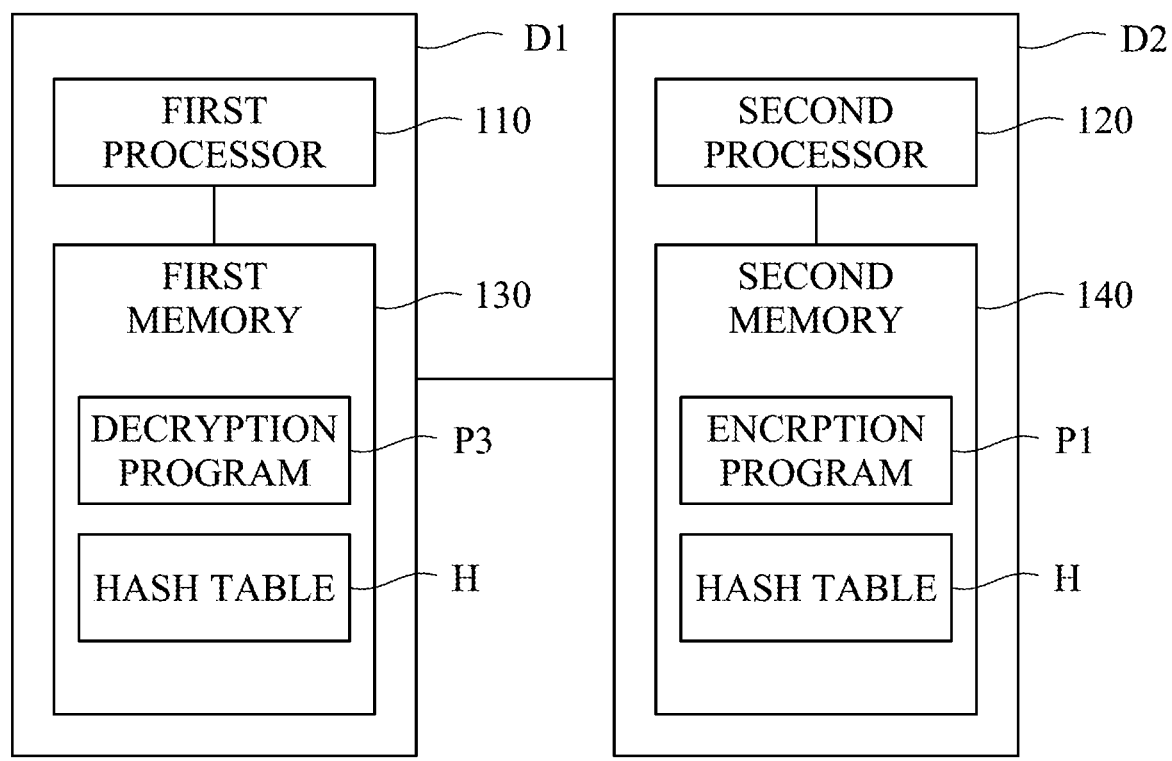
FIG. 1 is a schematic diagram of a software protection system, in accordance with an embodiment of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. Besides, although the terms "first," "second," etc., may be used herein to describe various elements, these terms are used to distinguish one element from another. Unless the context indicates otherwise clearly, these terms does not specifically refer to or imply order or sequence, nor does they intend to limit the present invention.

A software protection system or a method in various embodiments of the present disclosure is implemented for encrypting an executable file or an object file in a way of encrypting segment(s) of program code(s) and hiding key(s), in order to achieve an effect of software protection. In various embodiments of the present disclosure, it is exemplarily illustrated as operations of encrypting or decrypting the executable file.

In some embodiments, the executable file includes program codes and data, and the executable file is partitioned into various sections. Each of the sections includes corresponding program codes or data, and a first byte is indicated as an address in a memory corresponding to such section, for accessing corresponding data and performing corresponding operations. In some embodiments, the executable file or executable program provided in the present disclosure is referred to as the program codes or instructions that have been compiled and are executable to perform specific functions.

FIG. 1 is a schematic diagram of a software protection system 100, in accordance with an embodiment of the present disclosure. As illustrated in FIG. 1, the software protection system 100 includes a first processor 110, a second processor 120, a first memory 130 and a second memory 140. The first processor 110 and the first memory 130 are operated in a first device D1, and the second processor 120 and the second memory 140 are operated in a second device D2. The first device D1 and the second device D2 are communicatively connected to each other.

In some embodiments, the first memory 130 is configured to store a decryption program P3. The first processor 110 is configured to execute the decryption program P3 in the first memory 130, such that the software protection system 100 is able to perform decryption operations on an encrypted executable file. In some embodiments, the second memory 140 is configured to store an encryption program P1. The second processor 120 is configured to execute the encryption program P1 in the second memory 140, such that the software protection system 100 is able to perform encryption operations on an executable file.

In some embodiments, the encryption program P1 is an application program for encrypting the executable file (or the object file). By executing the encryption program P1, encryption algorithm(s) can be used to encrypt the executable file, the object file, or other files. In some embodiments, the foresaid encryption algorithms include a feature extraction algorithm, a hash algorithm, or the like.

In some embodiments, the decryption program P3 is an application program for decrypting the encrypted executable file (or the encrypted object file). By executing the decryption program P3, decryption algorithm (s) can be utilized to find out a key of the encrypted executable file (or the encrypted object file). The key is configured to be executed for decrypting the encrypted executable file (or the encrypted object file), in order to generate the original executable file (or the original object file).

In some embodiments, the first processor 110 and the second processor 120 are respectively implemented by one of a central processing unit (CPU), a multi-core processor, or an application specific integrated circuit (ASIC), and the types of the first processor 110 and the second processor 120 are not limited herein.

In some embodiments, the first memory 130 and the second memory 140 are respectively implemented by one of the computer readable media, which is one of a solid-state memory, a magnetic tape, a removable computer diskette, a random access memory (RAM), a read-only memory (ROM), a compact disk-read only memory (CD-ROM), a compact disk-read/write (CD-R/W), or a digital video disc (DVD), and the types of the first memory 130 and the second memory 140 are not limited herein.

In some embodiments, the first memory 130 and the second memory 140 include a volatile memory (VM) unit (not shown) and a non-volatile memory (NVM) unit (not shown) respectively. In some embodiments, the VM unit of the first memory 130 is configured to store the decryption program P3, and the NVM unit of the first memory 130 is configured to store hash table H. The VM unit of the second memory 140 is configured to store the encryption program P1, and the NVM unit of the second memory 140 is configured to store the hash table H.

In some embodiments, the first device D1 and the second device D2 are respectively one of a server, a mobile device or a computer, and the types of the first device D1 and the second device D2 are not limited herein. In operations, the first device D1 is communicated with the second device by means of wireless transmission. The first device D1 is configured to transmit the encrypted executable file to the second device D2, and the second device D2 stores the encrypted executable file accordingly.

For example, the second device D2 is the server and corresponds to an aspect of software development. The executable file and the encryption program P1 are loaded in the second memory 140. The first device D1 is a smart phone and corresponds to an aspect of any user. The encrypted executable file received from the second device D2 is transmitted through Bluetooth to the first device D1, and the encrypted executable file is loaded in the first memory 130. The user is able to use the first device D1 to make the first processor 110 execute the decryption program P3. The decryption program P3 is executed to perform the decryption operations on the encrypted executable file, thereby, the executable file that has not been encrypted being decrypted. Accordingly, the user is able to utilize the first device D1 to execute the decrypted executable file for performing the corresponding operations.

In various embodiments, the software protection system 100 mentioned above include multiple first processors 110, multiple second processors 120, multiple first memories 130 and/or multiple second memories 140, and these elements are able to be operated in multiple first devices D1 and/or multiple second devices D2 correspondingly. The numbers of the processors and memories in the software protection system 100 are not limited herein.

For example, in various embodiments, the first processors 110 are operated in one first device D1, and share one of the first memories 130. The second processors 120 are operated in the second devices D2 respectively, and are configured to perform the corresponding operations with the corresponding second memories 140 respectively.

Figure 2:
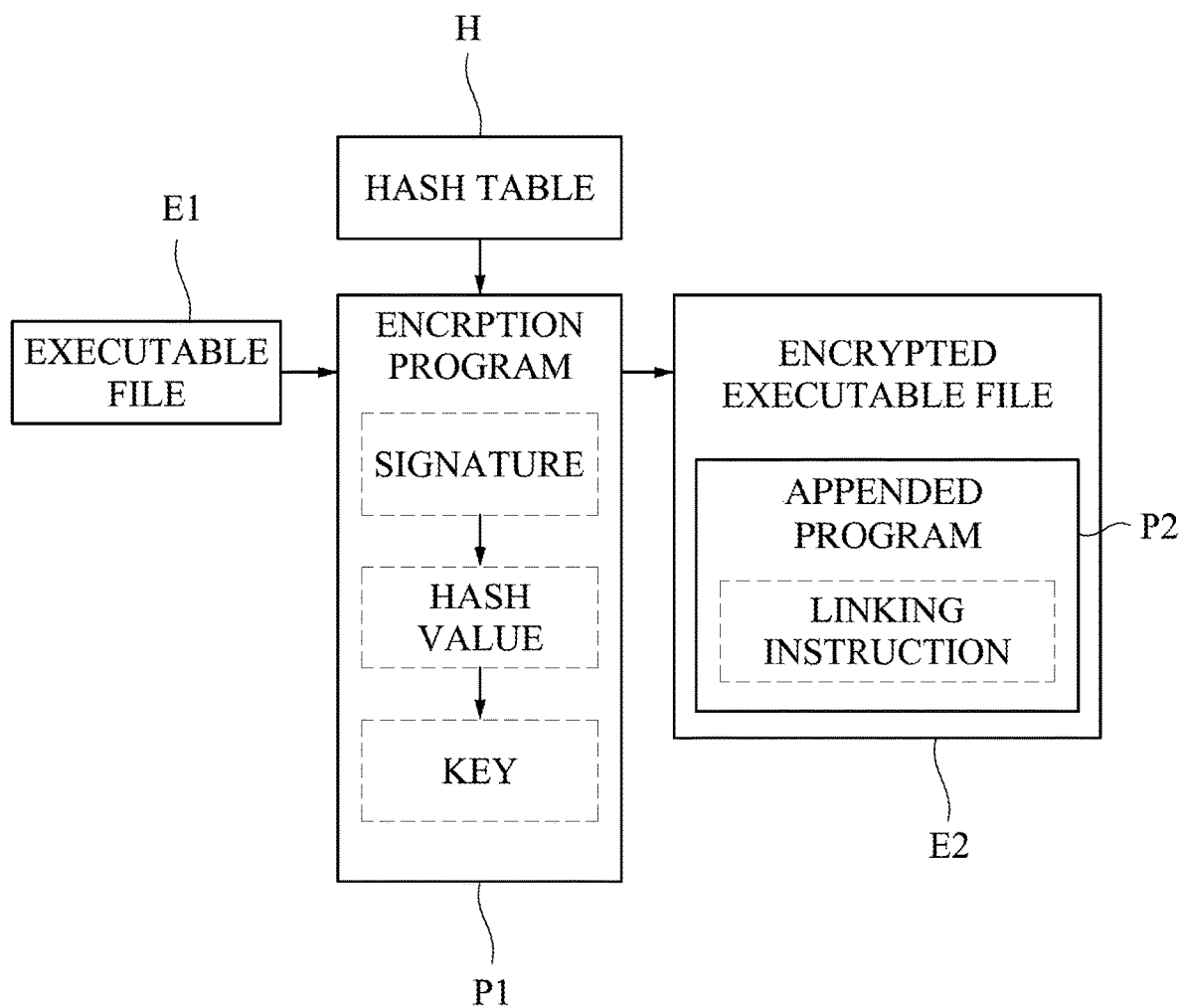
FIG. 2 is a schematic diagram for performing an encryption process, in accordance with FIG. 1.

FIG. 2 is a schematic diagram for performing an encryption process, in accordance with some embodiments of the present disclosure. The following embodiments in FIG. 2 are illustrated with an example of the second device D2 shown in FIG. 1, which is not limited herein. Any devices that are able to perform the encryption process shown in FIG. 2 are within the scope of the present disclosure.

As illustrated in FIGS. 1 and 2, the second processor 120 and the second memory 140 are able to be executed cooperatively for performing the encryption operations. The second memory 140 is configured to store an executable file E1, the encryption program P1, the hash table H, and the encrypted executable file E2. The specific processes for performing the encryption are discussed below.

Figure 3:
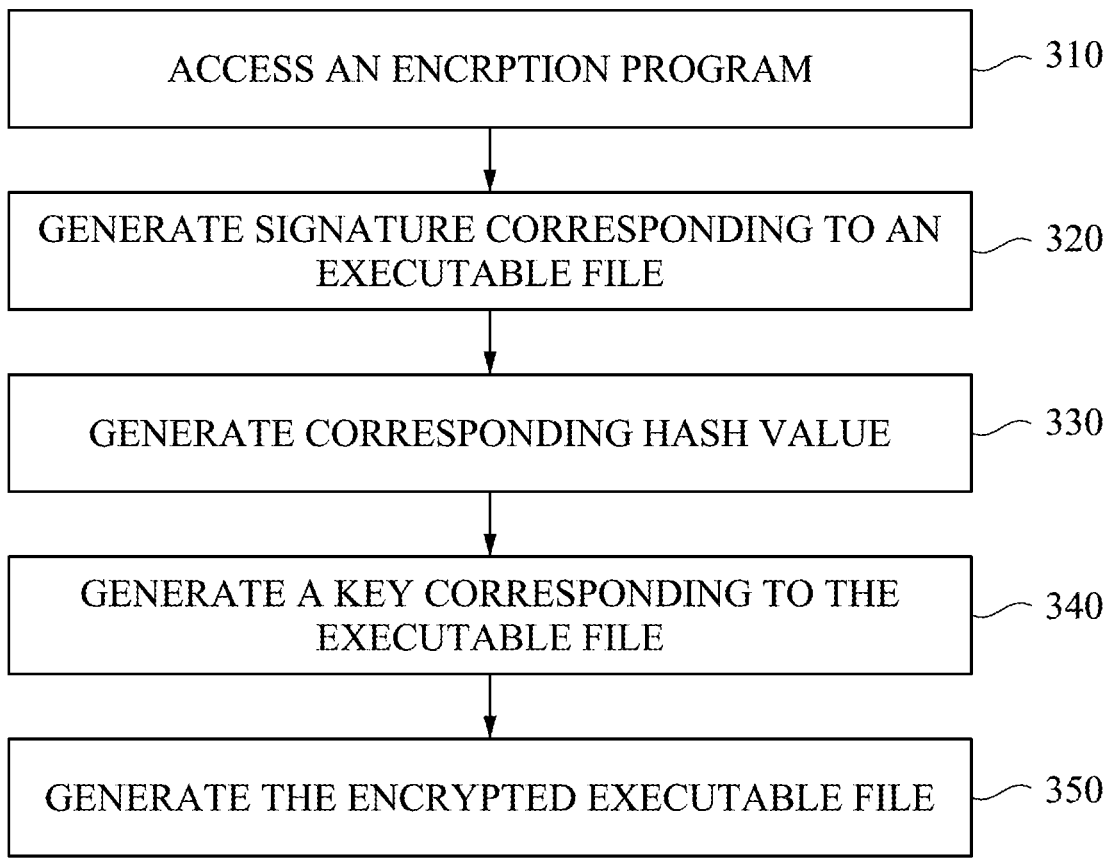
FIG. 3 is a flowchart of a method for performing the encryption, in accordance with FIG. 2.

FIG. 3 is a flowchart of a method 300 for performing the encryption, in accordance with some embodiments of the present disclosure. As illustrated in FIG. 3, the method 300 for performing the encryption includes steps 310, 320, 330, 340 and 350, and at least the steps 320, 330, 340 and 350 correspond to operations of executing the encryption program P1. For clarity, the following method 300 for performing the encryption is discussed with the embodiments illustrated in FIGS. 1 and 2. However, the method 300 for performing the encryption is not limited to be applied to the embodiments illustrated in FIGS. 1 and 2.

First of all, in the step 310, an encryption program is accessed. For example, with reference to FIGS. 1 and 2, the second processor 120 accesses the encryption program P1 in the second memory 140, and executes the encryption program P1 to perform the subsequent and corresponding encryption operations.

Continuously, in the step 320, a signature corresponding to an executable file is generated. For example, with reference to FIGS. 1 and 2, the second processor 120 executes the encryption program P1 to perform the encryption algorithm (e.g., the feature extraction algorithm). Accordingly, the signature of the executable file E1 is extracted, and the signature corresponding to the executable file E1 is generated.

Secondly, in the step 330, a corresponding hash value is generated. For example, with reference to FIGS. 1 and 2, the second processor 120 executes the encryption program P1 to perform the encryption algorithm (e.g., the hash algorithm) based on the hash table H. Accordingly, the signature corresponding to the executable file E1 is computed, and the corresponding hash value is generated.

Furthermore, in the step 340, a key corresponding to the executable file is generated. For example, with reference to FIGS. 1 and 2, the second processor 120 executes the encryption program P1 to further perform the encryption algorithm (e.g., the hash algorithm) based on the hash table H. Accordingly, the key corresponding to the executable file E1 is generated.

In some embodiments, the signature, the hash value, and the key are data that correspond to the executable file E1. The hash value and the key are irreversible computing data that are computed by performing the hash algorithm. Therefore, these data have high protection.

In some embodiments, a data format of at least one of the signature, the hash value or the key is a set of string. In other embodiments, the data format of at least one of the signature, the hash value or the key is multiple sets of string with various lengths. The data formats of the signature, the hash value and the key are not limited herein.

In some embodiments, the data format of the hash table H is two-dimensional array or three-dimensional array, and a memory capacity of the signature is greater than 512 byte. As such, for various executable files E1, a possibility, that various hash values computed by performing the encryption program P1 are the same (i.e., collision), is very low. Therefore, a possibility, that the keys corresponding to different executable files E1 are the same, is decreased, and the data protection is increased accordingly.

Subsequently, in the step 350, the encrypted executable file is generated. For example, with reference to FIGS. 1 and 2, the second processor 120 executes the encryption program P1 to further perform the encryption algorithm based on the generated key, in order to encrypt the executable file E1 and to generate the encrypted executable file E2 accordingly. The encrypted executable file E2 is transmitted to the first device D1 by the second device D2 continuously, and the first device D1 is configured to perform the decryption operations on the encrypted executable file E2.

Compared to the original executable file E1, the encrypted executable file E2 is unable to be accessed and/or executed normally. Therefore, it is necessary to perform the decryption operations on the encrypted executable file E2 additionally, and the specific processes thereof are discussed with reference to FIGS. 4A and 4B.

It should be demonstrated that the encrypted executable file E2 has an appended section of program codes for the decryption, and such program codes for the decryption are indicated as appended codes, in some embodiments. Such appended section of program codes is executable as an appended program P2 (shown in FIG. 2) that is able to be executed by a specific hardware. The appended program P2 includes the program codes that are generated in the encryption process for performing the subsequent decryption operations. In some embodiments, the appended program P2 is also indicated as an appended code(s) or an appended section. The appended program P2 does not include the generated key, and is independent with the key, in order to achieve good protection effect accordingly. In addition, in some embodiments, the appended program P2 includes a section of program codes for pointing (or being directed to) address(es). In some embodiments, such section of program codes for pointing the address is indicated as a linking instruction (which is discussed in detailed with reference to FIGS. 4A and 5).

Based on the above discussion, it is able to make the executable file E1 be encrypted as the encrypted executable file E2 with high protection by means of the encryption process mentioned above.

Figure 4A:
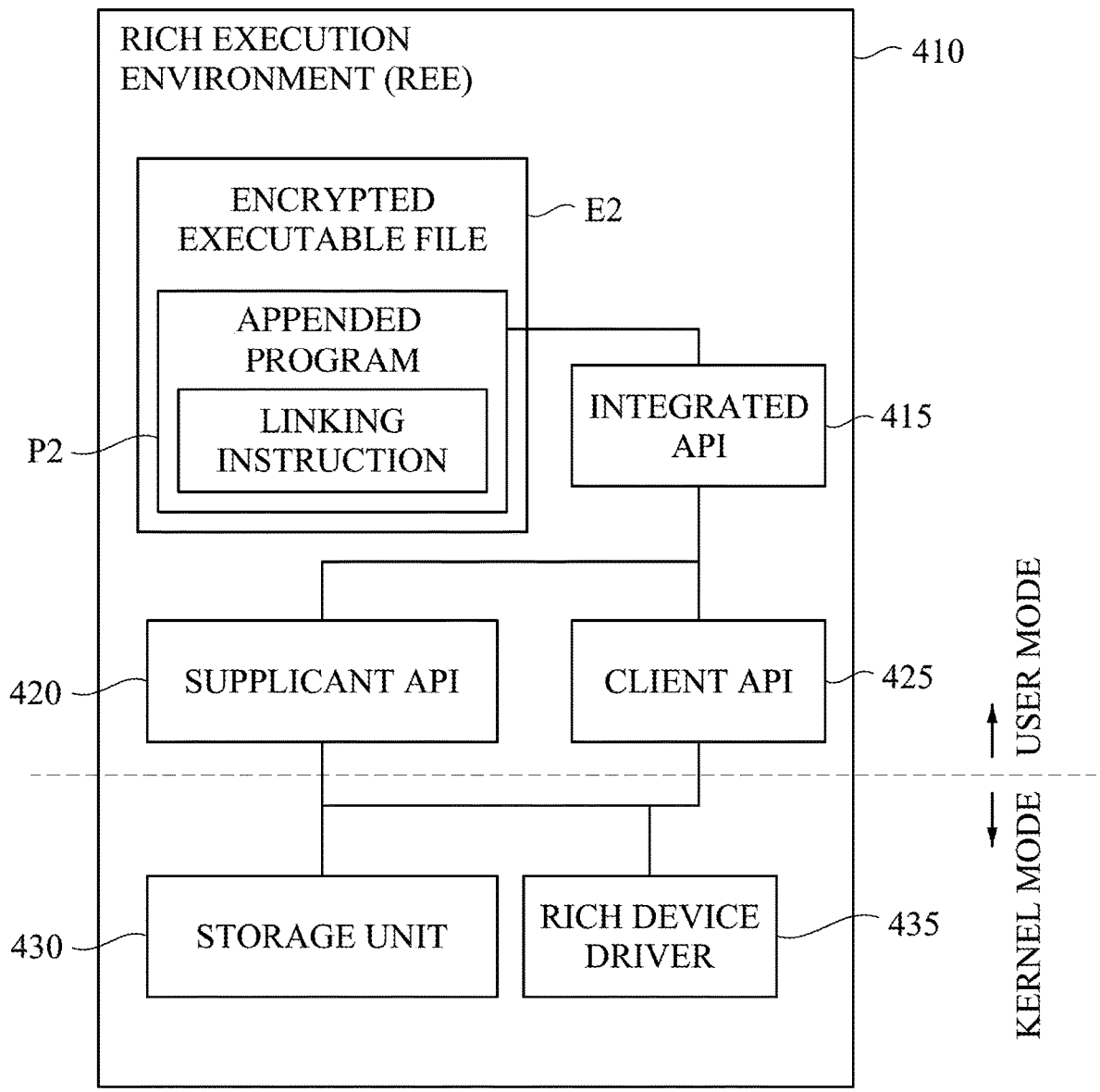
FIGS. 4A and 4B are schematic diagrams for performing a decryption process, in accordance with FIG. 1.
Figure 4B:
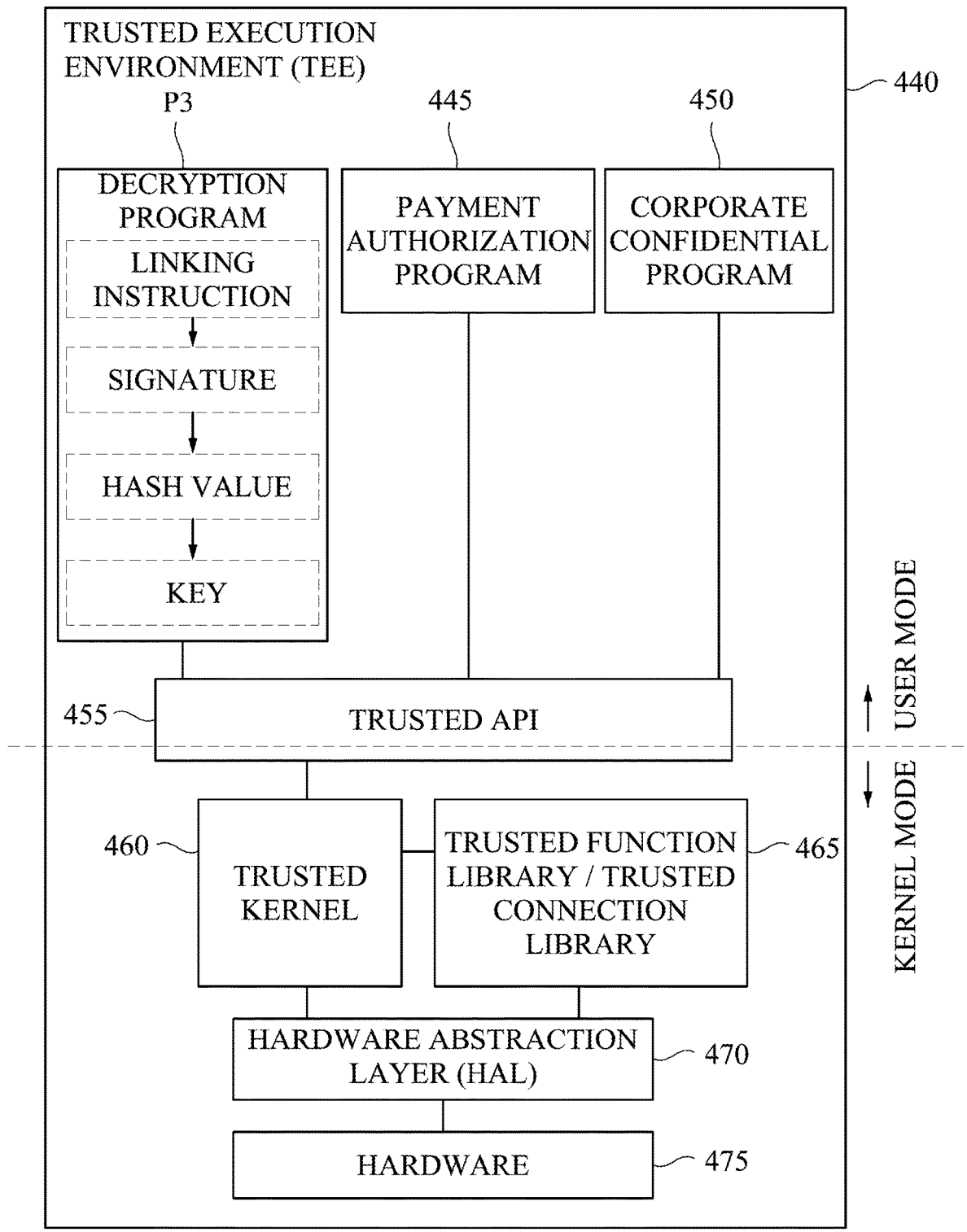

FIGS. 4A and 4B are schematic diagrams for performing a decryption process, in accordance with some embodiments of the present disclosure. The following embodiments in FIGS. 4A and 4B are illustrated with an example of the first device D1 shown in FIG. 1, which is not limited herein. Any devices that are able to perform the decryption process shown in FIGS. 4A and 4B are within the scope of the present disclosure.

As illustrated in FIGS. 1, 4A and 4B, the first processor 110 and the first memory 130 are able to be executed cooperatively for performing the decryption operations. The first memory 130 is configured to store the encrypted executable file E2, the decryption program P3, and the hash table H.

In some embodiments, as illustrated in FIGS. 4A and 4B, the first memory 130 is configured to store multiple execution environments. The execution environment is also indicated as an operating environment which is mainly and generally referred to as both of hardware and software, and includes the corresponding memory, processor, and operating system and program stored in the memory.

In some embodiments, as illustrated in FIG. 4A, the execution environment includes a rich execution environment (REE) 410 which is also indicated as a rich world and is associated with a first operating system. In addition, as illustrated in FIG. 4B, the execution environment includes a trusted execution environment (TEE) 440 which is also indicated as a secure world and is associated with a second operating system that is different from the first operating system. The rich execution environment 410 and the trusted execution environment 440 are operating systems that are independent to each other. Both of the execution environments 410 and 440 are able to communicate/transmit or exchange data through respective kernels (e.g., kernel drivers) to each other, but are isolated to each other while respective operations are performed. It is also be understood that various and independent operating systems are constructed based on such memory, and these independent operating systems include a rich operating system (i.e., the rich execution environment 410) and a trusted operating system (i.e., the trusted execution environment 440). In some embodiments, the first operating system and the second operating system are respectively one of Microsoft Windows system or Linux system.

In some embodiments, the trusted execution environment 440 has a first security level and is configured to perform operations that are confidential. These operations include, for example, authentication or the decryption operations in the embodiments of the present disclosure. The rich execution environment 410 has a second security level with a security which is lower than that within the first security level, and is configured to perform remaining operations. These remaining operations include, for example, functions of general applications.

In some embodiments, in the trusted execution environment 440, the operations are performed by inputting instructions or by demanding corresponding operations from the rich execution environment 410. Each of the operations and the corresponding data or program codes in the trusted execution environment 440 is independent from the rich execution environment 410. On the other hand, in the rich execution environment 410, it is able to input the instructions or demands to the trusted execution environment 440, in order to make the programs/application programs in the trusted execution environment 440 perform the corresponding operations. However, it is unable to demand accessing the program codes or the data in the trusted execution environment 440.

In some embodiments, the rich execution environment 410 is configured to store general applications (e.g., the encrypted executable file E2 and the hash table), an integrated application programming interface (API) 415, a supplicant application programming interface 420, a client application programming interface 425, a storage unit 430, and a rich device driver 435.

The integrated application programming interface 415 is configured to be executed to integrate the supplicant application programming interface 420 and the client application programming interface 425. The client application programming interface 425 includes at least one executable function including, for example, dialing phone numbers, payment or browsing. The client application programming interface 425 is configured to be executed to demand accessing the date in the storage unit 430, for performing the corresponding executable function(s). The supplicant application programming interface 420 includes at least one programmable function, and is configured to be executed to communicate with the kernel (not shown) of the rich execution environment 410, for exchanging the data.

The storage unit 430 is configured to store the kernel data in the rich execution environment 410. The storage unit 430 is configured to be executed to access or exchange the stored data in a manner of system call by executing the supplicant application programming interface 420 or the client application programming interface 425.

In some embodiments, the storage unit 430 is implemented by a relay protected memory block (RPMB), and is configured to store the hash table that is necessary in the decryption operations. In some embodiments (which are not illustrated), the storage unit 430 is disposed in a kernel mode of the trusted execution environment 440.

The rich device driver 435 is configured to be executed to make the program codes or the instructions of the client application programming interface 425 or the supplicant application programming interface 420 are executed correspondingly. Accordingly, the client application programming interface 425 or the supplicant application programming interface 420 are able to communicate with the kernel of the rich execution environment 410. In addition, the rich device driver 435 is configured to be executed to further communicate with the kernel of the trusted execution environment 440, and is indicated as a middle communication between the rich execution environment 410 and the trusted execution environment 440. In some embodiments, the rich device driver 435 is referred to as a kernel driver, and is configured to be executed to enable the data exchange between the rich execution environment 410 and the trusted execution environment 440.

In addition, in various embodiments, the appended program P2 shown in FIG. 2 includes a section which is configured to be executed to point to (or direct to) a specific address of the program codes. The specific address of the program codes includes, for example, an address of the rich device driver 435, an address where the hash table is stored, and an address of some of sections of the encrypted executable file E2. Therefore, the appended program P2 is also indicated as the linking instruction or a secure instruction, in some embodiments.

In some embodiments, the "user mode" and the "kernel mode" shown in FIGS. 4A and 4B are associated with authorities for accessing the operating system. For example, the "user mode" is referred to as executing program/application program that has a low accessing authority and is able to perform general operations. However, if it has to access the kernel data or instructions, it has to communicate with the kernel mode in a manner of system call executed by the application programming interface (e.g., the client application programming interface 425) between the user mode and the kernel mode. On the other hand, the "kernel mode" is referred to as executing program/application program that has a high accessing authority and is able to execute/perform special instructions or operations. These special instructions or operations are able to be executed or performed the operations including, for example, managing the memory and managing the procedures. For instance, the authority of the encrypted executable file E2 for accessing the kernel data in the rich execution environment 410 is limited.

As illustrated in FIG. 4B, the trusted execution environment 440 is configured to store multiple application programs for managing confidential data, a trusted application programming interface 455, a trusted kernel 460, a trusted function library/trusted connection library 465, a hardware abstraction layer (HAL) 470 and a hardware 475. In some embodiments, these application programs for managing confidential data include, for example, the decryption program P3, a payment authorization program 445 and a corporate confidential program 450.

In some embodiments, the trusted application programming interface 455 includes at least one executable function and/or at least one programmable function, and is configured to be executed to communicate with the kernel (i.e., the trusted kernel 460) in the trusted execution environment 440, for exchanging the data. Besides, the applications in the rich execution environment 410 are able to executed to exchange data (e.g., network protocol address) with the application program (e.g., the payment authorization program 445) in the trusted execution environment 440 through the trusted application programming interface 455.

In some embodiments, the trusted kernel 460 is configured to be executed to control or manage the corresponding operations or resources that are configured to be performed/executed in the trusted execution environment 440. These corresponding operations or resources include, for example, a bus, the processor, or the trusted function library/trusted connection library 465. In various embodiments, the trusted kernel 460 is further configured to be executed to communicate with the rich execution environment 410, for exchanging the data.

In some embodiments, the trusted function library/trusted connection library 465 includes at least one of functions, a statically-linked library, or an import library, and is configured to store the corresponding data.

In some embodiments, the hardware abstraction layer 470 is configured to be executed to directly access the data in the hardware 475. The hardware 475 is configured to store the data that is necessary in the decryption operations, including the hash table discussed above.

In some embodiments, the first memory 130 and the first processor 110 that are configured to perform the decryption operations are designed and constructed with Trust Zone of ARM. It is split into a normal world (also indicated as a rich world) and a secure world, which correspond to the rich execution environment 410 and the trusted execution environment 440 respectively, in some embodiments. In various embodiments, the first memory 130 and the first processor 110 that are configured to perform the decryption operations are designed and constructed with software guard extensions (SGX) in Intel. It includes an Enclave which corresponds to the trusted execution environment 440. In some embodiments of the present disclosure, it is illustrated with the Trust Zone of ARM, which is not limited herein.

Figure 5:
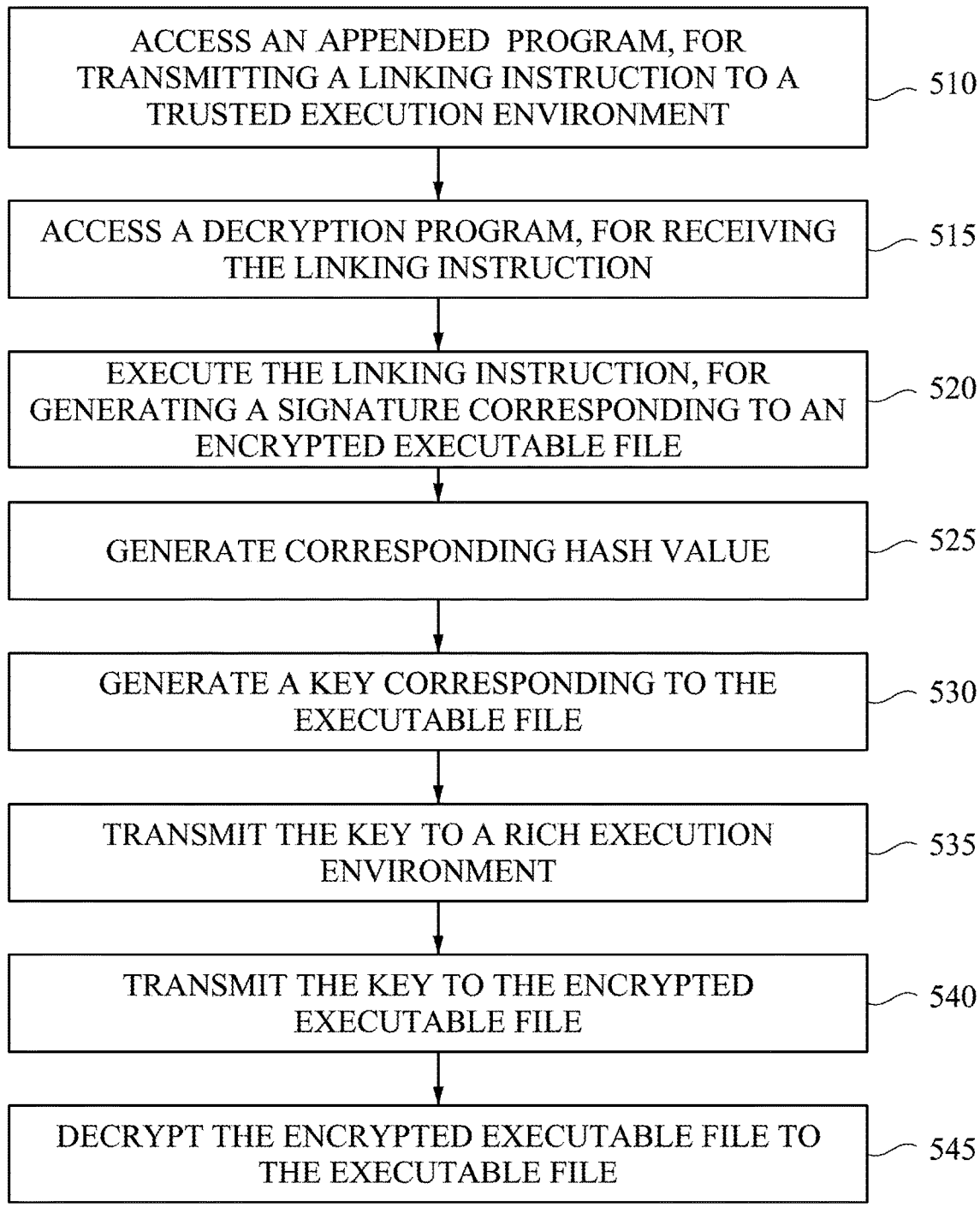
FIG. 5 is a flowchart of a method for performing the decryption, in accordance with FIGS. 4A and 4B.

FIG. 5 is a flowchart of a method 500 for performing the decryption, in accordance with some embodiments of the present disclosure. As illustrated in FIG. 5, the method 500 for performing the encryption includes steps 510, 515, 520, 525, 530, 535, 540 and 545, and at least the steps 510, 515, 520, 525, 530, 535, 540 and 545 correspond to operations of executing the decryption program P3. For clarity, the method 500 for performing the decryption as follows is discussed with the embodiments illustrated in FIGS. 1, 4A and 4B. However, the method 500 for operating the decryption is not limited to be applied to the embodiments illustrated in FIGS. 1, 4A and 4B.

In some embodiments, with reference to FIGS. 1 and 2, the first processor 110 executes the encrypted executable file E2 and the decryption program P3 stored in the first memory 130, in order to process the method 500 for performing the decryption as follows.

First of all, in the step 510, an appended program is accessed, for transmitting a linking instruction to a trusted execution environment. For example, with reference to FIGS. 1, 4A and 4B, in the user mode of the rich execution environment 410, the first processor 110 executes the appended program P2 in the second memory 140. Therefore, the linking instruction is transmitted, through the client application programming interface 425 and the rich device driver 435, to the kernel mode of the trusted execution environment 440. In some embodiments, the first processor 110 executes the appended program P2. Therefore, the linking instruction is directly transmitted through the rich device driver 435 to the trusted execution environment 440.

Continuously, in the step 515, a decryption program is accessed, for receiving the linking instruction. For example, with reference to FIGS. 1, 4A and 4B, in the kernel mode of the trusted execution environment 440, the first processor 110 executes the decryption program P3 in the first memory 130. Therefore, the linking instruction is transmitted through the trusted application programming interface 455 to the decryption program P3. Accordingly, the linking instruction is received by the decryption program P3.

Continuously, in the step 520, the linking instruction is executed, for generating a signature corresponding to an encrypted executable file. For example, with reference to FIGS. 1, 4A and 4B, in the user mode of the trusted execution environment 440, the first processor 110 executes the decryption program P3 in the first memory 130. Therefore, the linking instruction is executed by the decryption program P3, and a signature which corresponds to the encrypted executable file E2 is generated based on such linking instruction.

Secondly, in the step 525, a corresponding hash value is generated. For example, with reference to FIGS. 1, 4A and 4B, in the user mode of the trusted execution environment 440, the first processor 110 executes the decryption program P3 in the first memory 130; therefore, the signature which corresponds to the encrypted executable file E2 is computed by executing the decryption program P3, based on the decryption algorithm (e.g., hash algorithm) that is performed with the hash table, and the corresponding hash value is generated.

Furthermore, in the step 530, a key corresponding to the executable file is generated. For example, with reference to FIGS. 1, 4A and 4B, in the user mode of the trusted execution environment 440, the first processor 110 executes the decryption program P3 in the first memory 130; therefore, the decryption algorithm (e.g., hash algorithm) is performed by executing the decryption program P3, to compute the hash value in the step 525 based on the signature of the encrypted executable file E2 and the hash table, and the key which corresponds to the encrypted executable file E2 is generated.

In some embodiments, the hash table stored in the memory that is configured to be executed to perform the decryption, and the hash table stored in the memory that is configured to be executed to perform the encryption are the same. As a result, the key generated in the decryption operations is identical to the key generated in the encryption operations.

It should be noted that the memory is one type of the non-volatile memory, and such memory is configured to store the hash table, and include, for example, the storage unit 430, the hardware 475, and the second memory 140 configured to perform the encryption, in some embodiments. Therefore, it is able to reduce a possibility that the hash table is read arbitrarily, and it further increases the protection of the program code(s).

Furthermore, in the step 535, the key is transmitted to a rich execution environment. For example, with reference to FIGS. 1, 4A and 4B, in the kernel mode of the trusted execution environment 440, the first processor 110 executes the decryption program P3 in the first memory 130; therefore, the key is transmitted through the trusted application programming interface 455, to the trusted kernel 460, and the key is transmitted through the trusted kernel 460 to the rich execution environment 410.

Continuously, in the step 540, the key is transmitted to the encrypted executable file. For example, with reference to FIGS. 1, 4A and 4B, in the user mode of the rich execution environment 410, the first processor 110 executes the decryption program P3 in the first memory 130; therefore, the key is received by the rich device driver 435, and the key is further transmitted through the client application programming interface 425 to the encrypted executable file E2.

Subsequently, in the step 545, the encrypted executable file is decrypted to the executable file. For example, with reference to FIGS. 1, 4A and 4B, in the user mode of the rich execution environment 410, the first processor 110 executes the decryption program P3 in the first memory 130; therefore, the decryption algorithm is performed on the encrypted executable file E2, to decrypt the encrypted executable file E2, based on the received key by executing the decryption program P3, and the executable file E1 (shown in FIG. 2) has been decrypted.

In some embodiments, the program codes in the first memory 130 is further configured to implement Arm Trusted Firmware (ATF) which is configured to perform security check and configured to access the decryption program P3, for performing environment check. Some examples of the security check include access authority check for the trusted execution environment 440, and root permission check. Therefore, it is able to avoid cracking the software protection system in a manner of dynamic analysis.

To conclude, the key in the encryption or the decryption operations is merely operated in the step of generating the encrypted executable file or decrypting to the executable file. The key is obtained by being automatically computed without inputting authenticated data by the users, or with the dongle being additionally connected. Specially, in the steps of the decryption, the data that are generated in the processes or are needed are executed in the trusted execution environment; therefore, it achieves high protection of the key.

Although the present invention has been described in considerable detail with reference to certain embodiments thereof, it will be apparent to those skilled in the art that various modifications and variations can be made to the structure of the present invention without departing from the scope or spirit of the invention. As a result, it is intended that the present invention cover modifications and variations of this invention provided they fall within the scope of the following claims.

What is claimed is:

1. A software protection method, comprising:
    decrypting an encrypted executable file by a first processor, wherein the decrypting comprises:
        executing a linking instruction, in a first execution environment, wherein the encrypted executable file comprises the linking instruction;
        generating a signature corresponding to the encrypted executable file, based on the linking instruction, in the first execution environment;
        generating a key, based on the signature and a hash table, in the first execution environment;
        transmitting the key, from the first execution environment, to a second execution environment that is different from the first execution environment, wherein the encrypted executable file is in the second execution environment; and
        decrypting the encrypted executable file to an executable file, based on the key, in the second execution environment;
        wherein the encrypted executable file comprises an appended code, and the appended code are configured to be executed for being directed to a kernel driver of a memory corresponding to the first processor, and are configured to be executed for the linking instruction being transmitted to an execution environment that is configured to perform the decrypting through the kernel driver.

2. The software protection method of claim 1, wherein the first execution environment and the second execution environment are operating environments that are independent to each other, and the first execution environment is configured to transmit data to the second execution environment through the kernel driver.

3. The software protection method of claim 2, wherein the first execution environment is associated with a first operating system, the second execution environment is associated with a second operating system, the second operating system is configured to operate with the encrypted executable file, and the first operating system is configured to operate with at least one program code and the hash table that are configured to perform the decrypting.

4. The software protection method of claim 2, wherein the decrypting further comprises: executing the appended code, in the second execution environment, in order to transmit the linking instruction to the first execution environment through the kernel driver.

5. The software protection method of claim 1, further comprising:
    encrypting an executable file by a second processor that is communicatively connected to the first processor, wherein the encrypting comprises:
        generating the signature corresponding to the executable file;
        performing an encryption algorithm and generating the key, based on the signature and the hash table; and
        encrypting the executable file, based on the key, in order to generate the encrypted executable file.

6. The software protection method of claim 5, further comprising: transmitting, by the second processor, the encrypted executable file to a memory that is associated with the first processor.

7. A software protection system, comprising:
    a first processor; and
    a first memory configured to store at least one first program code,
    wherein the first processor is configured to execute the at least one first program code in the first memory, to execute a decryption program, wherein executing the decryption program comprising:
        executing a linking instruction, in a first execution environment, wherein the encrypted executable file comprises the linking instruction;
        generating a signature corresponding to an encrypted executable file, based on the linking instruction, in the first execution environment;
        generating a key, based on the signature and a hash table, in the first execution environment;
        transmitting the key, from the first execution environment, to a second execution environment that is different from the first execution environment, wherein the encrypted executable file is in the second execution environment; and
        decrypting the encrypted executable file to an executable file, based on the key, in the second execution environment;
        wherein the encrypted executable file comprises an appended code, and the appended code are configured to be executed for being directed to a kernel driver of the first memory corresponding to the first processor, and are configured to be executed for the linking instruction being transmitted to an execution environment that is configured to perform the decrypting through the kernel driver.

8. The software protection system of claim 7, wherein the first memory is further configured to store:
    the encrypted executable file associated with the second execution environment; and
    the decryption program and the hash table associated with the first execution environment,
    wherein the first execution environment and the second execution environment are operating environments that are independent to each other, and the first execution environment is configured to transmit data to the second execution environment through the kernel driver.

9. The software protection system of claim 8, wherein the first processor is configured to execute the at least one first program code in the first memory, to perform, in the second execution environment, operations comprising:
transmitting the linking instruction to the decryption program in the first execution environment through the kernel driver.

10. The software protection system of claim 8, wherein the first processor is configured to execute the at least one first program code in the first memory, to perform, in the second execution environment, operations comprising:
receiving the key from the first execution environment.

11. The software protection system of claim 7, further comprising:
a second processor communicatively connected to the first processor; and
a second memory configured to store at least one second program code,
wherein the second processor is configured to execute the at least one second program code in the second memory, to execute an encryption program, wherein executing the encryption program comprising:
generating the signature corresponding to an executable file;
performing an encryption algorithm and generating the key, based on the signature and the hash table; and
encrypting the executable file, based on the key, in order to generate the encrypted executable file.

* * * * *